Figure 1:
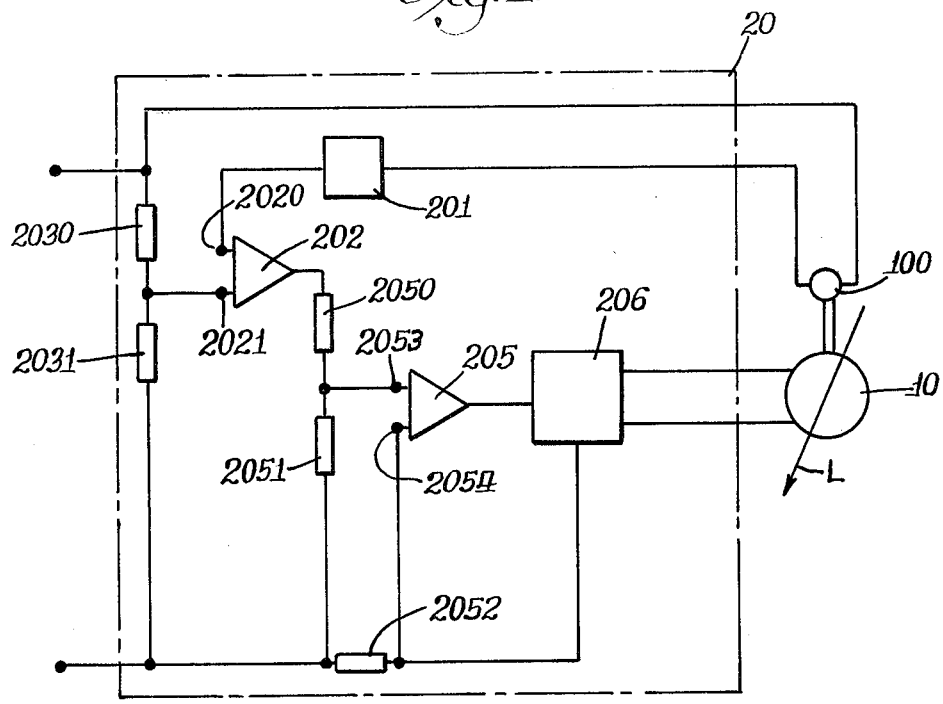

United States Patent [19]

Doemen et al.

[11] 4,426,604
[45] Jan. 17, 1984

[54] DIRECT CURRENT FAN WITH CONTROL MEANS

[76] Inventors: Benno Doemen, Talstiege 8; Rolf Müller, Ackerstr. AB, both of D-7742 St. Georgen, Fed. Rep. of Germany

[21] Appl. No.: 244,980

[22] Filed: Mar. 18, 1981

[30] Foreign Application Priority Data

Jun. 30, 1980 [DE] Fed. Rep. of Germany ....... 3024613

[51] Int. Cl.³ .............................................. H02P 7/06
[52] U.S. Cl. ..................................... 318/334; 318/473
[58] Field of Search ................ 318/334, 434, 471–473

[56] References Cited

U.S. PATENT DOCUMENTS

| | | | |
|---|---|---|---|
| 3,777,234 | 12/1973 | Luger | 318/334 X |
| 3,868,554 | 2/1975 | Konrad | 318/434 |
| 4,227,129 | 10/1980 | Brooks | 318/334 X |

*Primary Examiner*—J. V. Truhe
*Assistant Examiner*—W. E. Duncanson, Jr.
*Attorney, Agent, or Firm*—Fitch, Even, Tabin & Flannery

[57] ABSTRACT

A network controlled inlet is provided for current sensing in a comparator to control the current in direct current motors. An electrical signal generated from a physical parameter is conducted to the first input of the comparator and a signal characterizing the speed of the motor is conducted to the second inlet of the comparator.

2 Claims, 2 Drawing Figures

U.S. Patent

Jan. 17, 1984

4,426,604

DIRECT CURRENT FAN WITH CONTROL MEANS

The invention relates to a fan driven by a direct current motor and to a control circuit for limiting the current.

The importance of fans driven by direct current has grown due to the increasing number of battery-charged electronic devices.

Particularly fans driven by commutator-less direct current motors have the advantage of exceptionally long life, sensitive carbon brushes and the mechanically expensive commutator being dispensed with, and, in the absence of the brush noise, their run is exceptionally low noise.

But air discharge control in commutator-less direct current motor fans entails a considerable involvement of electronics. First, the drive pulses must be controlled synchronously with the rotation of the motor. Second, it is necessary to limit the current in motors with low-ohm windings, which are mostly used with fans, in order to hold within admissible limits the start-up current or also the current in the case of obstructed rotation. Otherwise, a spontaneous destruction of the circuit cannot be prevented.

Furthermore, current-limiting control systems are expedient in the case of weak power sources of direct current motors, such as primary cells, with the data being processed parallel thereto.

The heretofore indispensable control electronics can, for example, in commutator-less direct current motors, be simplified only to a limited extent.

Thus, the object arises better to utilize the existing control means, to direct the control system, for example, to new functions not subordinated to the control of the run, and so relatively reduce the control effort.

The object is solved by providing a network controlled inlet in the circuit for the current-limiting control system, designed as a comparator, wherein an electrical signal dependent on the fan current and generated from a physical parameter is conducted to the first inlet of the comparator and a signal characterizing the condition of the run of the motor is conducted to the second inlet of the comparator.

The advantage of the system is that now each physical parameter, which can be converted into an electrical signal and is under the influence of the fan current, can be closed by a sensor to an separate feedback circuit. Such parameters can be the ion density, the particulate content of the air, humidity of the air, temperature of the air or of parts of the system.

Furthermore, the fan can be driven at an optimum r.p.m. and without having to be driven at maximum r.p.m. Although in conventional systems the maximum r.p.m. is seldom used, the motor must be sized thereto. Thus, operation at optimum capacity reduces wear, development of (air) noise and transfer of the particulate matter in the air.

Additional structure associated with the control function is very limited: the current-limiting control system mostly consists of a comparator, whose one inlet controls the voltage on a load resistor through which flows the motor current and the second input controls the r.p.m.-determining signal. If the wiring of the second input is now in the form of a voltage divider, then the above described separate feedback circuit is closed, by using a sensor instead of the one voltage dividing resistor.

A particularly simple example of the invention is a thermocontrol system where a PTC or a NTC resistor replaces the one resistor of the current-limiting voltage divider.

Figure 2:
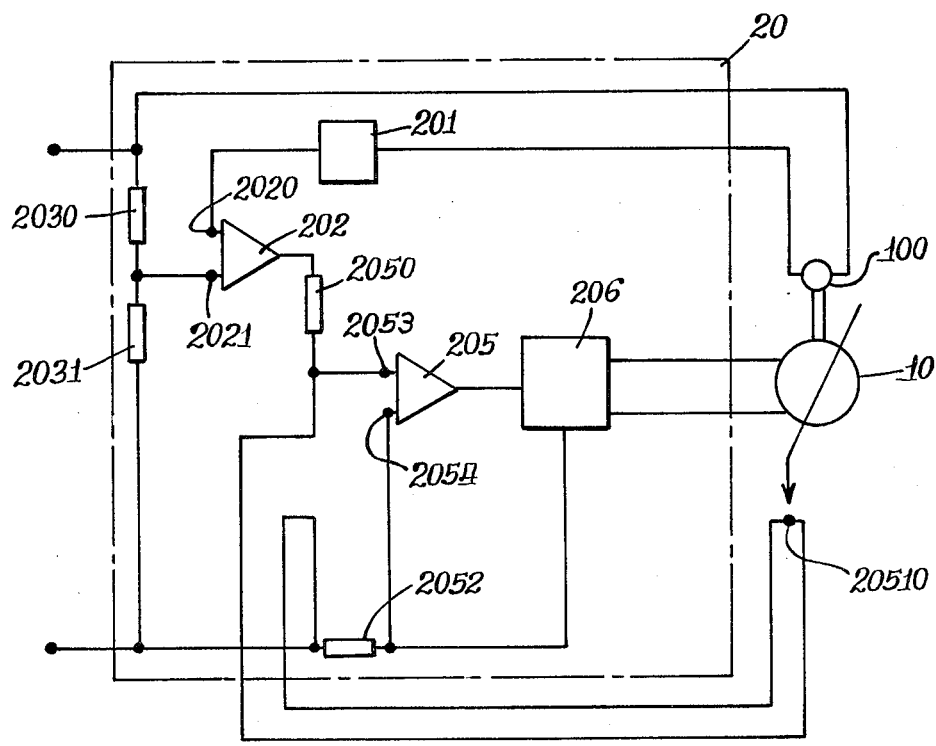

The invention will be now described in greater details on the basis of the accompanying drawing, wherein:

FIG. 1 is a typical network for controlling the run of a commutator-less fan motor, FIG. 2 is a modified embodiment according to the invention.

In FIG. 1 a commutator-less direct current motor 10 is monitored by a sensor 100 of run controlling means 20. The signal of sensor 100, amplified by an amplifier 201, reaches an r.p.m. comparator 202 at inlet 2020 thereof. Second inlet 2021 is connected to a voltage divider 2030, 2031, which determines the final r.p.m. of the system.

The output of the r.p.m. comparator 202 is brought to a current-limiting control means, comprising a voltage divider 2050, 2051, a current-sensing resistor 2052 and a current comparator 205. The current comparator 205 controls the power amplifier 206, which drives the direct current motor 10. Air L is moved by a fan driven by the direct current motor 10. The fan can be designed as a radial or an axial fan and, as a rule, a fan wheel is fastened to the shaft of the motor 10.

On switching on the system, the r.p.m. comparator 202 remains unbalanced, until the voltage at inlet 2020 measured by sensor 100 and dependent on the r.p.m. corresponds to the voltage at inlet 2021 firmly adjusted by the voltage divider 2030, 2031.

Amplifier 206 which drives the direct current motor is controlled by comparator 205. The same becomes unbalanced when voltage is changed by the voltage divider, and this corresponds to the change in the r.p.m. Due to the fact that the second input of the comparator 205 is not connected to the source voltage but to the receiver side of the current sensing resistor 2052 lying ahead of the load, the unbalance is reduced at the inlet of comparator 205, and thereby the feedback amplification and the source load. Also eliminated is the risk of the spontaneous destruction of the electronic system by too high increase of the current.

In FIG. 2 resistor 2051 is replaced by a PTC resistor 20510, disposed on a part of the entire device influenced by air stream L. This can be the air stream itself or a member disposed in the air stream. On the rise of temperature, voltage rises in the comparator 205 and the efficiency of the fan motor is increased. Thus, the entire system is controlled by temperature. This kind of control is also particularly advantageous because it concurs with the working capacity.

Any other physical parameter can be applied instead of temperature as a control value, convertible into an electric signal and changeable by the air stream.

What is claimed is:

1. In a fan driven by a direct current motor, a control circuit for limiting inrush current on starting and for controlling fan speed, comprising:
    a comparator having two inputs;
    means for generating a first signal, said first signal having a value directly related to a physical condition of the air stream through the fan, said first signal being fed to one of the inputs of said comparator; and
    means for generating a second signal, said second signal having a value directly related to the load current of the motor, said second signal being fed to the other of the two inputs of said comparator, whereby the speed of said fan will vary in accordance with change in the physical condition of the air stream through the fan.

2. A control circuit in accordance with claim 1, wherein said means for generating the first signal having a value directly related to a physical condition of the air stream through the fan is a voltage divider, one element of which is a PTC resistor that senses and responds to the temperature of the air stream, whereby the speed of the fan will increase on a rise in air temperature and will decrease on a lowering in air temperature.

* * * * *